Figure 1:
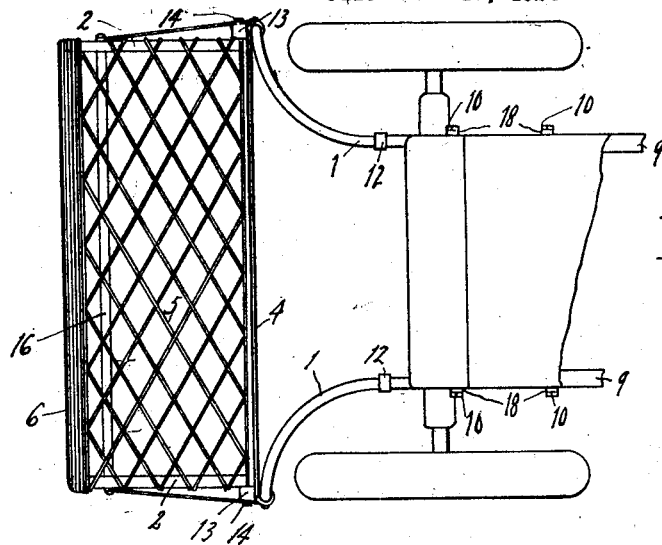

April 14, 1925.

W. P. WILLIAMSON ET AL

SAFETY DEVICE FOR AUTOMOBILES

Filed Dec. 17, 1924

INVENTORS.
William P. Williamson,
BY Austin C. Quimby,
Frank A. Cutter,
ATTORNEY.

Patented Apr. 14, 1925.

1,533,717

UNITED STATES PATENT OFFICE.

WILLIAM P. WILLIAMSON AND AUSTIN C. QUIMBY, OF LUDLOW, MASSACHUSETTS.

SAFETY DEVICE FOR AUTOMOBILES.

Application filed December 17, 1924. Serial No. 756,463.

*To all whom it may concern:*

Be it known that we, WILLIAM P. WILLIAMSON and AUSTIN C. QUIMBY, both citizens of the United States of America, and residents of Ludlow, in the county of Hampden and State of Massachusetts, have jointly invented a new and useful Safety Device for Automobiles, of which the following is a specification.

Our invention relates to improvements in devices or appliances adapted to be attached to the front ends of automobiles for the purpose of preventing injury to persons who may be in the path of and struck by automobiles so equipped, and the same consists essentially of a pair of peculiarly-shaped arms which are adapted to be attached to the frame of an automobile in front, said arms having vertical parts between which extend flexible members to form a yielding back for the device, side-pieces hinged at their rear ends to said arms adjacent to the bottoms thereof, and bent or curved downwardly and rearwardly at their forward terminals, a flexible netting extending between said side-pieces to form a yielding floor or platform for said device, flexible members extending between said curved terminals, to form a yielding buffer for the device, and flexible supporting members extending from said arms to said side-pieces, together with such other parts and members as may be necessary or desirable in order to render the device complete and serviceable in every respect, all as hereinafter set forth.

The primary object of our invention is to produce a device, of the character described above, which is applicable to automobiles generally, and which is so constructed as to afford a sufficiently yielding and safe landing place for a person who may be in the path of an automobile equipped with such device, and struck with sufficient force to throw him off of his feet.

Another object is to produce such a device which is comparatively simple and inexpensive in construction, yet strong and durable, and withal highly efficient and practicable. There is practically no part of this device which is liable to get out of order or become broken under ordinary conditions of use, but, in the event any part or member of the same should become seriously damaged or broken, the same can be easily repaired or replaced.

A further object is to provide a safety device which is capable of being folded or of having its hinged section turned up against the back out of the way, when the device is not in use, or when the machine to which the device is attached is parked. The aforesaid hinged section can be easily and quickly swung up out of the way against the back of the device, and as easily and quickly swung down again into operative position.

Other objects and advantages will appear in the course of the following description.

We attain the objects and secure the advantages of our invention, by the means illustrated in the accompanying drawings, in which—

Figure 2:
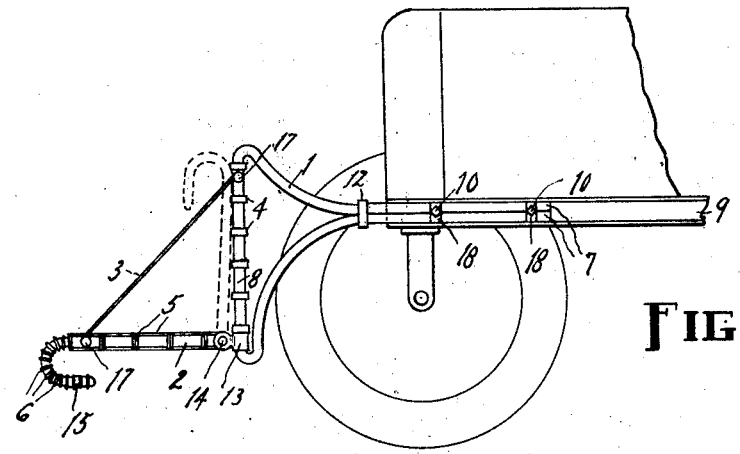
Figure 3:
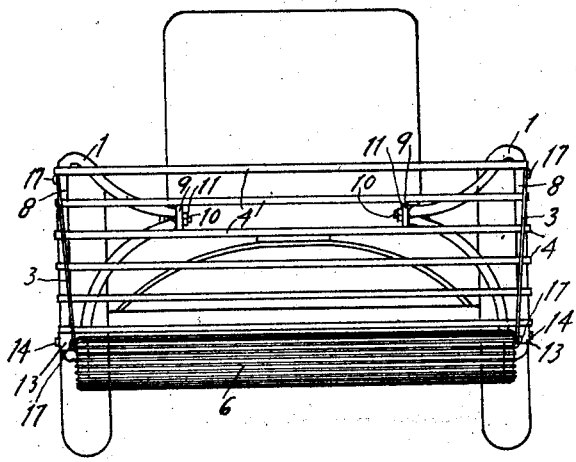

Figure 1 is a top plan of a safety device which embodies a practical form of our invention, the same being illustrated in connection with parts at the front end of an automobile; Fig. 2, a side elevation of said device, and of the aforesaid automobile parts, and, Fig. 3, a front elevation of said device and parts.

Similar reference characters designate similar parts throughout the several views.

Our safety device comprises a pair of fixed arms 1, a pair of hinged side-pieces 2, a pair of supports 3, a plurality of back-forming straps 4, a floor- or platform-forming netting 5, and a plurality of buffer-forming straps 6.

Each arm 1 consists of a rod bent to form straight, horizontal, contiguous parts 7 at the rear end and a straight, approximately vertical part 8 at the front end, said arm curving outwardly from said horizontal parts to an extent sufficient to locate said vertical part in front of the adjacent wheel of the automobile to which the device is attached. The horizontal parts 7 of each arm 1 are, in the present example, received in a channel-iron 9 which forms a part of the frame of the automobile, and said parts are secured by means of bolts 10—10 to said channel-iron. There is a clip 17 on each bolt 10 between the head thereof and the associated parts 7, and a nut 11 on such bolt inside of the channel-iron 9. The parts 7 enter the front ends of the channel-irons 9. A clip 12 is placed on each arm 1, in front of the channel-iron 9 in which the parts 7 are received, to fasten said parts together and assist in stiffening the arm structure.

The straps 4 extend between and are secured to the vertical parts 8 of the arms 1, and form a yielding back for the device. These straps are spaced apart from each other, and there may be any suitable number of the same.

Sleeved to each vertical part 8, at the lower end of and projecting forwardly from the same, is a lug 13 through which there is a lateral opening to receive a pivot member 14, by means of which one of the side-pieces 2 is hinged to said vertical part. Preferably, the rear terminal of each side-piece 2 is bent outwardly and passed through the contiguous lug 13. The pivot or hinge terminals 14 may be upset in the outside of the lugs 13, for the purpose of preventing said terminals from becoming detached from said lugs. The netting 5, which may be of wire, cord, or other suitable and more or less flexible material, is attached at the ends to the side-pieces 2, and constitutes the platform of the device.

Each side-piece 2 is bent or curved downwardly and rearwardly at the forward terminal, as best shown at 15 in Fig. 2. The rear ends of the curved terminal portions 15, of the side-pieces 2, are connected by means of a rod 16. The rod 16 may be a separate member which has its ends secured to the rear ends of the curved terminal portions 15, or the side-pieces 2, including said terminal portions, and said rod may be made out of a single piece of stock bent to form such members.

The straps 6 extend between and are secured to the curved terminal portions 15 and form a yielding buffer at the front edge of the platform of the device.

The supports 3 are made of chains or cords and each is securely attached at one end to one of the vertical parts 8 adjacent to the top thereof, and at the other end to the side-piece 2 which is pivotally connected with such vertical part, as illustrated at 17—17. The supports 3 are of sufficient length to maintain the side-pieces 2 when turned down in an approximately horizontal position. Being flexible the supports 3 do not interfere with the movement of the side-pieces 2 when they are swung upwardly against the back of the device, into the position indicated by broken lines in Fig. 2, or with the movement of said side-pieces when they are again swung down into a horizontal position.

Since the pivot terminals 14 are forward of the back of the device, it is evident that the platform of said device can be turned up against said back, and that it will remain in its elevated or raised position because of the upward and rearward inclination thereof. Very little force is necessary, however, to swing the platform down again. The platform is turned up into inoperative position against the back of the device, when the car is parked, or when for any other reason the device is not needed, but whenever the device is needed said platform is turned down into the approximately horizontal and operative position, and is retained by gravity in such position.

In practice, if a person be struck by the buffer with which the device is provided at the front edge, he falls backwardly onto the platform and against the back of said device. Due to the presence of the straps 6, the force of the blow is materially decreased, and due to the presence of the netting 5 and the straps 4, the force of the fall and rearward impact is broken, consequently serious injury to the person is prevented.

Any suitable means for securing the arms 1 to the frame of an automobile may be substituted for the clips 18, bolts 10, and nuts 11, and it is quite obvious that cords or fabric bands or strips might be substituted for the straps 4 and 6.

More or less change in the shape, size, construction, and arrangement of some or all of the parts of this device, in addition to those hereinbefore specifically pointed out, may be made without departing from the spirit of our invention or exceeding the scope of what is claimed.

What we claim as our invention, and desire to secure by Letters Patent, is—

1. As an improved article of manufacture, a safety device, for automobiles, comprising arms which are adapted to be attached to the frame of an automobile, flexible members attached at their ends to said arms and forming a yielding back, side-pieces pivotally connected at their rear ends with said arms, flexible material attached at its ends to said side-pieces to form a yielding platform, and means to support in an approximately horizontal position said side-pieces from said arms.

2. As an improved article of manufacture, a safety device, for automobiles, comprising arms which are adapted to be attached to the frame of an automobile, and are provided with flexible members to form a yielding back, side-pieces pivotally connected with said arms and provided with connected flexible material to form a yielding platform, and with flexible members to form a yielding buffer, and means to support in an approximately horizontal position said side-pieces from said arms.

3. The combination, in a safety device for automobiles, with arms adapted to be attached to the frame of an automobile, and having approximately vertical parts at their front ends, and a plurality of yielding members extending between said vertical parts, of side-pieces pivotally connected with said vertical parts, a netting extending between said side-pieces, and flexible supports between said vertical parts and said side-pieces to carry the latter in an approximately horizontal position.

4. The combination, in a safety device for automobiles, with arms adapted to be attached to the frame of an automobile, and having approximately vertical parts at their front ends, and a plurality of yielding members extending between said vertical parts, of side-pieces pivotally connected with said vertical parts, said side-pieces being bent downwardly and rearwardly at their forward terminals, a netting extending between said side-pieces, a plurality of yielding members extending between said bent terminals, and flexible supports between said vertical parts and said side-pieces to carry the latter in an approximately horizontal position.

5. The combination, in a safety device for automobiles, with arms adapted to be attached to the frame of an automobile, said arms having at their front ends approximately vertical parts, and a plurality of yielding members extending between such vertical parts, of side-pieces pivotally connected with said vertical parts, and being bent downwardly and rearwardly at their forward terminals and provided with a connecting rod between the rear ends of such bent terminals, a netting extending between said side-pieces, a plurality of yielding members extending between said bent terminals, and flexible supports extending between said vertical parts and said side-pieces, and adapted to carry the latter in an approximately horizontal position.

6. The combination, in a safety device for automobiles, with arms adapted to be attached to the frame of an automobile, and having approximately vertical parts at their front ends, a plurality of yielding members extending between such vertical parts, and perforated lugs attached to said vertical parts, of side-pieces having outwardly-extending terminals which enter the openings in said lugs, said side-pieces being bent downwardly and rearwardly at their forward terminals and provided with a connecting rod between the rear ends of such bent terminals, a netting extending between said side-pieces, a plurality of yielding members extending between said bent terminals, and flexible supports extending between said vertical parts and said side-pieces, and adapted to carry the latter in an approximately horizontal position.

7. The combination, in a safety device for automobiles, with arms having in front approximately vertical parts, and behind straight parallel parts which are adapted to be received in the side channel-irons of an automobile frame, and a plurality of yielding members extending between said vertical parts, of side-pieces pivotally connected with said vertical parts, and being bent downwardly and rearwardly at their forward terminals and provided with a connecting rod between the rear ends of such bent terminals, a netting extending between said side-pieces, a plurality of yielding members extending between said bent terminals, and supports extending between said vertical parts and said side-pieces, and adapted to carry the latter in an approximately horizontal position.

WILLIAM P. WILLIAMSON.
AUSTIN C. QUIMBY.

Witnesses:
F. A. CUTTER,
C. C. WEST.